United States Patent
Matsuo

(10) Patent No.: US 8,964,257 B2
(45) Date of Patent: Feb. 24, 2015

(54) IMAGE FORMING AND PROCESSING APPARATUSES FOR REQUANTIZING QUANTIZED DATA USING SIGMA-DELTA MODULATION AND COMPENSATING FOR UNEVENESS OF EXPOSURE INTENSITY

(75) Inventor: Shimpei Matsuo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 522 days.

(21) Appl. No.: 13/306,222

(22) Filed: Nov. 29, 2011

(65) Prior Publication Data

US 2012/0162667 A1    Jun. 28, 2012

(30) Foreign Application Priority Data

Dec. 22, 2010   (JP) ................................ 2010-286645

(51) Int. Cl.
*H04N 1/40*      (2006.01)
*G06K 15/02*     (2006.01)
*H04N 1/401*     (2006.01)
*G06K 15/12*     (2006.01)
*G03G 15/00*     (2006.01)
*G03G 13/04*     (2006.01)

(52) U.S. Cl.
CPC ........ *G06K 15/1868* (2013.01); *H04N 1/40031* (2013.01); *H04N 1/4015* (2013.01); *G06K 15/1209* (2013.01); *G06K 15/1247* (2013.01)
USPC ............ 358/3.26; 358/3.03; 399/49; 347/131

(58) Field of Classification Search
None
See application file for complete search history.

(56) References Cited

U.S. PATENT DOCUMENTS

| 7,671,321 | B2 * | 3/2010 | Perlman et al. | 250/216 |
| 8,125,362 | B1 * | 2/2012 | Bereza | 341/143 |
| 8,447,197 | B2 * | 5/2013 | Yamazaki | 399/49 |

FOREIGN PATENT DOCUMENTS

| JP | 2001-111823 | 4/2001 |
| JP | 2003-189100 | 7/2003 |
| JP | 2005-354235 | 12/2005 |
| JP | 2008-155458 | 7/2008 |
| JP | 2009-187422 | 8/2009 |

* cited by examiner

*Primary Examiner* — Steven Kau
(74) *Attorney, Agent, or Firm* — Fitzpatrick, Cella, Harper & Scinto

(57) ABSTRACT

An image forming apparatus of this invention, when an exposure unit performs exposure, applies, to image data quantized by a first number of bits, compensation data for compensating for unevenness of the exposure intensity occurring on a photosensitive member caused by a lens array used in the exposure unit. This compensation data is obtained by quantizing, by a second number of bits larger than the first number of bits, data corresponding to a change in measurement value obtained by measuring unevenness of exposure occurring on the photosensitive member from a reference value used in the measurement, and requantizing the quantized data by the first number of bits by using sigma-delta modulation.

8 Claims, 9 Drawing Sheets

FIG. 3
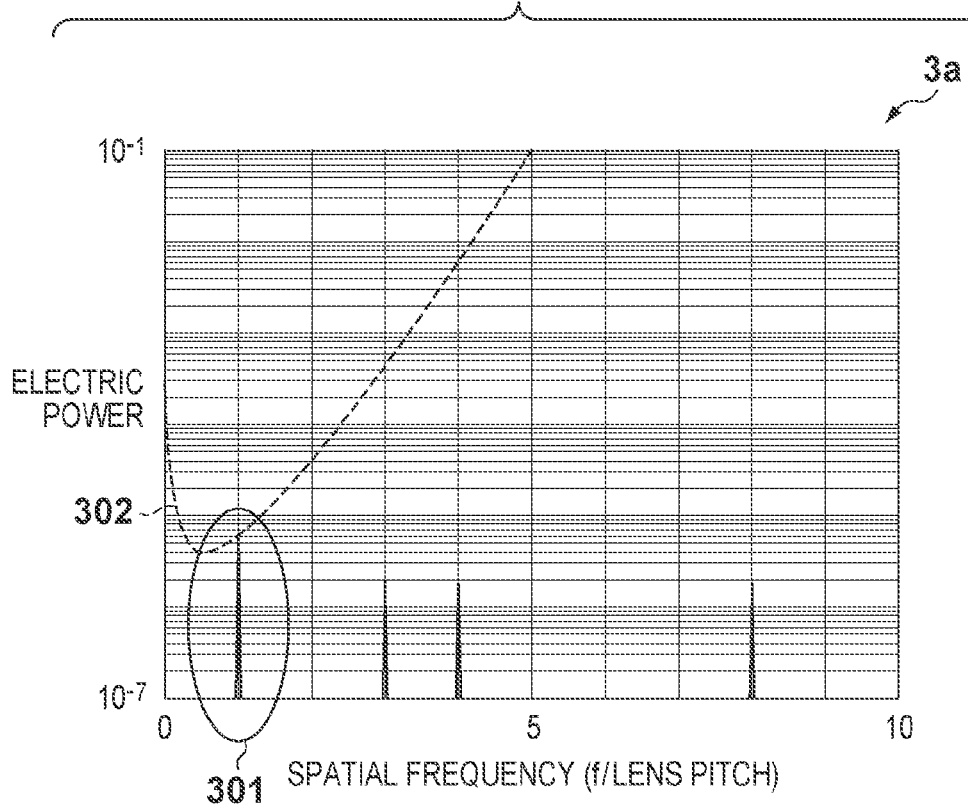
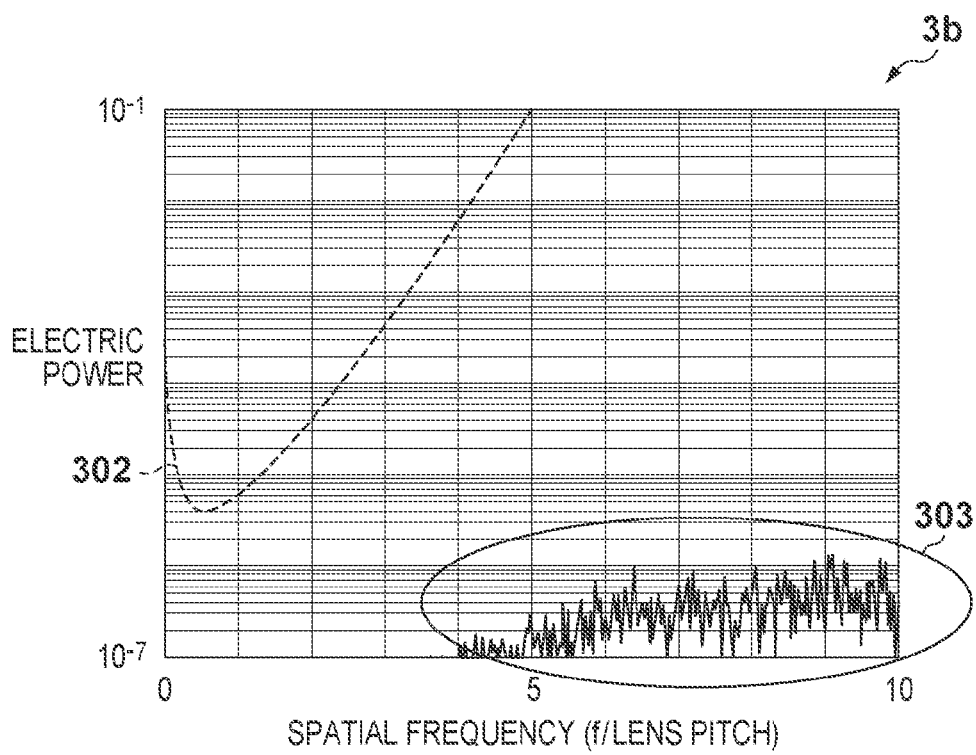

IMAGE FORMING AND PROCESSING APPARATUSES FOR REQUANTIZING QUANTIZED DATA USING SIGMA-DELTA MODULATION AND COMPENSATING FOR UNEVENESS OF EXPOSURE INTENSITY

BACKGROUND OF THE INVENTION

1. Field of the Invention

The present invention relates to an image forming apparatus and image processing apparatus.

2. Description of the Related Art

As an exposure apparatus for use in an electrophotographic image forming apparatus such as a printer and a copying machine, an exposure apparatus including a plurality of linearly arranged light-emitting elements and an image forming optical system including a linearly arranged lens array has been put to practical use. The exposure apparatus generally controls the light emission amount of the plurality of light-emitting elements stepwise in accordance with an image signal, and forms an image of exposure light emitted by the light-emitting elements on the surface of the photosensitive member by using the lens array, thereby exposing the surface of a photosensitive member to light.

An electrostatic latent image formed on the photosensitive member by exposure by the exposure apparatus as described above can have unevenness of exposure (unevenness of a density) caused by, for example, variations in light emission amount between pixels or the optical transmission characteristics of lenses. To reduce this unevenness of exposure, Japanese Patent Laid-Open No. 2001-111823, for example, has disclosed a method in which correction data generated in accordance with the unevenness of exposure is prestored in a memory, and the gain of the light emission amount of each light-emitting element is adjusted by applying this correction data to image data for exposure.

As the lens array of the exposure apparatus, a gradient index lens that can singly form an erect image and can be downsized in accordance with the uniformity between lenses is generally used. The gradient index lens has the optical characteristic that an image of incident light is formed by zigzagging the light in the lens. Accordingly, the transmission of light is restricted by an incident pupil and a maximum view angle acting in the incident pupil. More specifically, the gradient index lens has a view range in which the illuminance on an image plane abruptly decreases by an almost inverse-square characteristic with respect to the distance from the lens axis, and becomes zero in the image plane position of the maximum view angle. When compared to an ordinary lens that gradually decreases the light amount by the $\cos^4$ characteristic, therefore, the gradient index lens has the feature that the width of a light amount fluctuation caused by the decrease in marginal lumination is large.

When the gradient index lens as described above is used as the lens array of the exposure apparatus, the increase in width of the light amount fluctuation caused by the decrease in marginal lumination can be a main cause of the unevenness of exposure. In addition, if the degree of this unevenness of exposure is large, the tone reproducibility after exposure by the exposure apparatus may deteriorate. The tone reproducibility of the exposure apparatus is defined by a dynamic range obtained by subtracting a range corresponding to the compensation amount of the unevenness of exposure from a dynamic range obtained by the number of quantization steps having a digital value corresponding to the light emission amount of the light-emitting elements. The number of quantization steps having a digital value corresponding to the light emission amount of the light-emitting elements is generally restricted to about eight bits by taking account of, for example, the production cost or the accuracy of hardware used in production. To secure the dynamic range corresponding to tone information of image data by about eight quantization bits, it is necessary to reduce the range corresponding to the compensation amount of the unevenness of exposure by reducing the unevenness of exposure in advance.

As a method of reducing the unevenness of exposure caused by the above-described marginal lumination characteristic of the gradient index lens, a method using double lens arrays as the lens array of the exposure apparatus is known. FIG. 9 shows the difference between illuminance characteristics when using a single lens array 901 and double lens arrays 902 as the lens array of the exposure apparatus. When using double lens arrays as shown in FIG. 9, it is possible to increase the ratio at which the view ranges of the image forming planes of lenses overlap each other. This reduces the decrease in marginal lumination in the image forming plane and the unevenness of illuminance, thereby reducing the unevenness of exposure.

Unfortunately, the above-described prior art has the following problem. To form double lens arrays in the exposure apparatus, not only the use amount of lenses doubles, but also it may become difficult to ensure a given off-axial aberration or the like because the lens center deviates from the optical axis, when compared to a single lens array. Accordingly, the production cost increases when providing, with double lens arrays in order to reduce the unevenness of the exposure intensity, an exposure apparatus that controls the exposure intensity by a predetermined, limited number of quantization bits.

SUMMARY OF THE INVENTION

The present invention has been made in consideration of the above problem, and provides a technique of compensating for the unevenness of the exposure intensity, regardless of the arrangement of a lens array, in an exposure apparatus that controls the exposure intensity by a predetermined number of quantization bits.

According to one aspect of the present invention, there is provided an image forming apparatus which comprises an image carrier, and forms an image on a recording material by developing an electrostatic latent image formed on the image carrier by a developer, and transferring the developed image onto the recording material, comprising: an exposure unit that includes a plurality of linearly arranged light-emitting elements that emit light by a light amount corresponding to image data quantized by a first number of bits, and a lens array including a plurality of linearly arranged lenses, and exposes the image carrier to light by forming an image of the light emitted by each of the plurality of light-emitting elements on the image carrier by a corresponding lens in the lens array; a storage unit storing compensation data to be applied to the image data, the compensation data being used to compensate for unevenness of exposure equivalent to unevenness of exposure intensity occurring on the image carrier when the exposure unit performs exposure; and a compensation unit that compensates for the unevenness of exposure by applying the compensation data stored in the storage unit to the image data, wherein the compensation data is obtained by quantizing, by a second number of bits larger than the first number of bits, data corresponding to a change in measurement value obtained by measuring the unevenness of exposure occurring on the image carrier from a reference value used in the measurement, and requantizing the quantized data by the first number of bits by using sigma-delta modulation.

According to another aspect of the present invention, there is provided an image processing apparatus which is connected to an exposure apparatus that includes a plurality of linearly arranged light-emitting elements that emit light by a light amount corresponding to image data quantized by a first number of bits, and a lens array including a plurality of linearly arranged lenses, and exposes an exposure target to light by forming an image of the light emitted by each of the plurality of light-emitting elements on the exposure target by a corresponding lens in the lens array, and which generates compensation data to be applied to the image data in order to compensate for unevenness of exposure equivalent to unevenness of exposure intensity occurring on the exposure target when the exposure apparatus performs exposure, comprising: a measurement unit that measures unevenness of exposure occurring on the exposure target exposed to light by the exposure apparatus; a generation unit that generates quantized data by quantizing, by a second number of bits larger than the first number of bits, data corresponding to a change in measurement value obtained by measurement by the measurement unit from a reference value used in the measurement; and a modulation unit that applies sigma-delta modulation to the quantized data having the second number of bits generated by the generation unit, and outputs the compensation data requantized by the first number of bits.

The present invention can provide a technique of compensating for the unevenness of the exposure intensity, regardless of the arrangement of a lens array, in an exposure apparatus that controls the exposure intensity by a predetermined number of quantization bits.

Further features of the present invention will become apparent from the following description of exemplary embodiments (with reference to the attached drawings).

BRIEF DESCRIPTION OF THE DRAWINGS

FIG. 3 is a view showing computer simulation results concerning the exposure unevenness compensation process according to the first embodiment;

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

Figure 1:
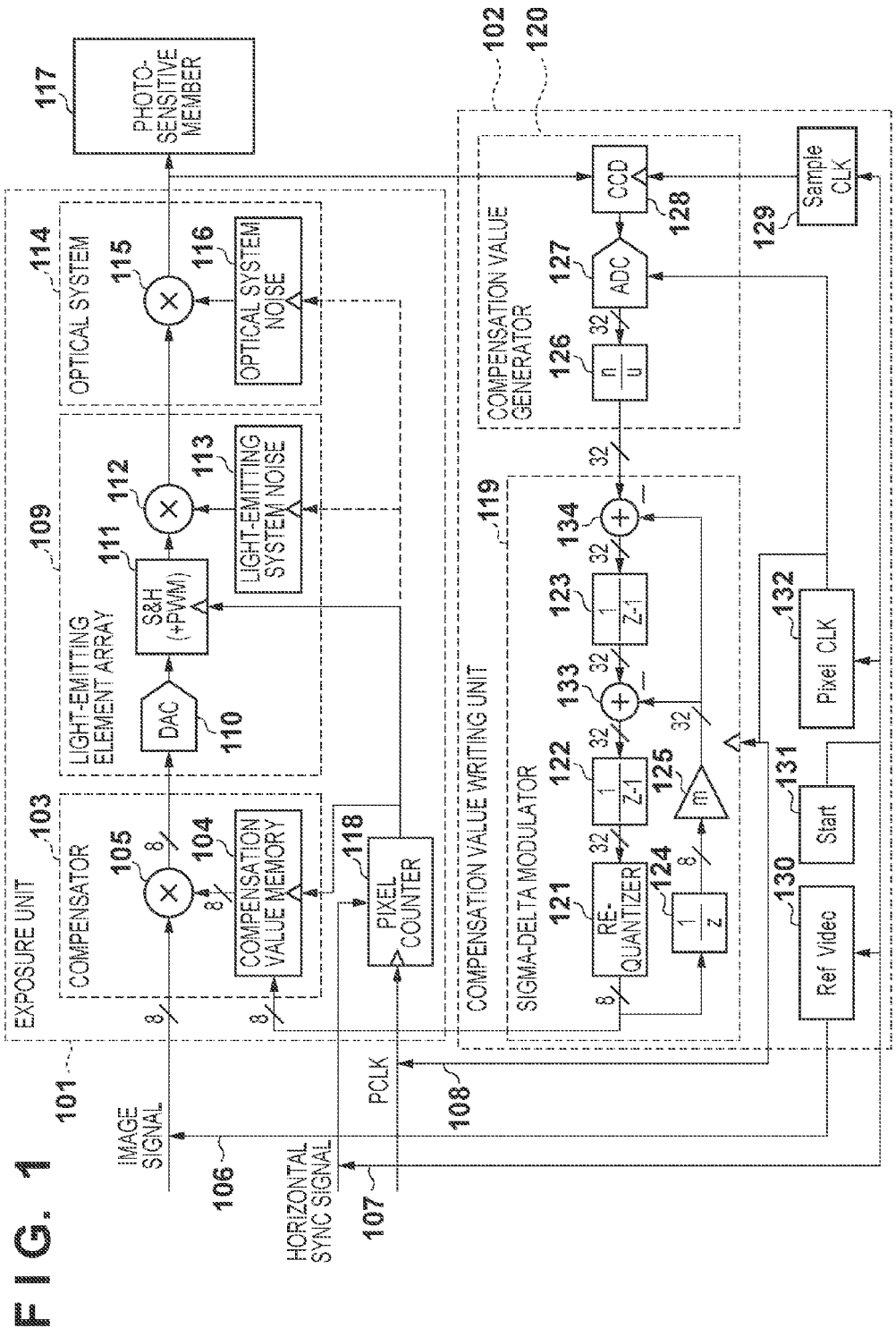
FIG. 1 is a block diagram of signal processing related to an exposure unevenness compensation process according to the first embodiment.

First, signal processing related to an exposure unevenness compensation process will be explained with reference to FIG. 1. Referring to FIG. 1, an exposure unit (exposure apparatus) 101 is connected to a compensation value writing unit 102. In this embodiment, the compensation value writing unit 102 forms an image processing apparatus that is connected to the exposure apparatus, and generates a compensation value (compensation data) for compensating for the unevenness of exposure equivalent to the unevenness of the exposure intensity occurring on a photosensitive member 117 as an exposure target when the exposure apparatus performs exposure. The compensation value generated by the compensation value writing unit 102 is finally written in a compensation value memory 104 of the exposure unit 101, and applied to image data when exposure is performed.

This embodiment features that the compensation value writing unit 102 uses second-order sigma-delta modulation by a sigma-delta modulator 119, when requantizing a compensation value generated based on the measurement value of the unevenness of exposure output from a CCD 128.

Referring to FIG. 1, each numerical value attached to a line between blocks indicates the number of quantization bits (the bit width) of digital data transmitted through the line, and indicates an information amount transmitted for each clock through the line. Also, each line having no numerical value attached transmits data having an analog amount or a digital amount having an arbitrary number of quantization bits. The exposure unit 101 includes a compensator 103, light-emitting element array 109, optical system 114, and pixel counter 118.

(Exposure Unit 101)

In the exposure unit 101, the compensator 103 applies the compensation for the unevenness of exposure to image data contained in an input image signal as will be described later. The exposure unit 101 controls the light emission amount of the light-emitting element array 109 stepwise based on the image data after the unevenness of exposure is compensated for. "Stepwise control" herein mentioned means light emission by an amount corresponding to the image data. The light-emitting element array 109 includes a plurality of linearly arranged light-emitting elements (light-emitting devices), and emits light toward the photosensitive member 117 as an exposure target via the optical system 114. In the exposure unit 101, the optical system 114 is an image forming optical system for forming an image of incident light emitted from the plurality of light-emitting elements of the light-emitting element array 109, on the photosensitive member 117 by corresponding lenses. Thus, in the exposure unit 101, the light-emitting element array 109 and optical system 114 expose the photosensitive member 117 to light based on the image data.

When the exposure unit 101 performs exposure, the compensator 103 sequentially reads out compensation values (eight bits) as exposure unevenness compensation data for image data for exposure, from the compensation value memory 104 at the output timing of the pixel counter 118, and inputs the readout values to a multiplier 105. More specifically, a horizontal sync signal generator 131 generates a horizontal sync signal 107, and inputs the signal to the pixel counter 118. Then, the pixel counter 118 starts a counting operation, and inputs, as a read address, a count value corresponding to the present pixel position of an image signal to the compensation value memory 104. The compensation value memory 104 sequentially reads out compensation values corresponding to the input pixel counter values. The multiplier 105 multiplies the image data (eight bits) contained in an image signal 106 by the compensation value from the compensation value memory 104, thereby compensating for the unevenness of exposure of the corresponding image data. The image data for which the unevenness of exposure is compensated is input to the light-emitting element array 109 in the next stage. In this embodiment, image data and a compensation value to be finally applied to the image data are each expressed by an eight-bit digital value, which corresponds to a first number of bits.

The image data having undergone the compensation for the unevenness of exposure and input to the light-emitting element array 109 is first input to a D/A converter (DAC) 110 in the light-emitting element array 109. In this embodiment as shown in FIG. 1, the number of bits input to the D/A converter is eight, and this number depends on the accuracy of light emission amount control. Of 16 bits obtained as a digital operation result in the multiplier 105 in the previous stage, data of only effective upper eight bits is input to the D/A converter 110. The D/A converter 110 outputs data of an analog amount corresponding to the light emission control amount to a sample-and-hold circuit 111.

The sample-and-hold circuit 111 holds an analog amount corresponding to light emission amount data of a one-line zone in exposure scanning for the photosensitive member 117. Also, the sample-and-hold circuit 111 can control the duty ratio of a pulse width to be input to a multiplier 112 in accordance with the output from the DAC 110. Note that the analog amount processed by the sample-and-hold circuit 111 need only be a physical quantity by which the integral light amount can linearly be controlled when each light-emitting device emits light in a one-line zone. Examples of the analog amount are a voltage, electric current, and electric power. Note that the integral light amount is, for example, a time integral obtained by duty control of the pulse width. Even when the light emission amount is locally nonlinear with respect to the physical amount as described above, the exposure unit 101 need only perform linear conversion by performing gamma correction on the light emission amount.

In this embodiment, the light-emitting device (not shown) included in the light-emitting element array 109 is an organic EL element, and light emission control of this light-emitting element is pulse-width ON control using a constant voltage. In this control, even when the light-emitting device has a nonlinear light emission characteristic with respect to the physical amount of a voltage or electric current, linear control using the duty ratio of a pulse width to be input can be performed by fixing the physical amount corresponding to the light amount when the device is ON. This makes it possible to control the light emission amount by using a simple triangular wave pulse width modulation circuit, without forming any large-scale circuit for performing, for example, table computation for gamma correction in the exposure unit 101.

In the light-emitting element array 109, the light-emitting devices emit exposure light toward the photosensitive member 117 by the light amount based on the output from the sample-and-hold circuit 111. This exposure light irradiates the photosensitive member 117 through the optical system 114 including a lens array made up of a plurality of linearly arranged lenses, thereby forming an image on the photosensitive member 117. Thus, the exposure unit 101 exposes the photosensitive member 117 to light based on the image data, and forms an electrostatic latent image based on the image data on the photosensitive member 117.

Light-emitting system noise 113 shown in FIG. 1 is a model expressing, together with the multiplier 112, an exposure unevenness component (noise component) which is generated in the light-emitting element array 109 and unique to a light-emitting element, and corresponds to the variation in light emission efficiency of each pixel. This noise component is multiplicatively superposed on the light emission amount (gain) in the light-emitting element array 109. Also, optical system noise 116 shown in FIG. 1 is a model expressing, together with a multiplier 115, an exposure unevenness component (noise component) corresponding to the variation in transmission efficient unique to the lens array included in the optical system 114. This noise component is multiplicatively superposed on the light emission amount in the light-emitting element array 109, and periodically appears in accordance with the lens pitch (lens period) of the lens array. Note that the light-emitting system noise 113 and optical system noise 116 are respectively equivalent to a first exposure unevenness component and second exposure unevenness component.

To reduce these exposure unevenness components (noise components) generated in the light-emitting element array 109 and optical system 114, the compensator 103 applies the compensation value obtained by the compensation value writing unit 102 to the image data. Note that a noise component that is generated in the exposure unit 101 by combining the noise components generated in the light-emitting element array 109 and optical system 114 will be referred to as "exposure system noise" hereinafter. The compensator 103 compensates for the unevenness of exposure by multiplying the image data (the gain of the light emission amount) by the compensation value, so that the product of the exposure system noise and compensation value becomes 1 (the exposure system noise and compensation value cancel each other). Consequently, a noise component remaining after the compensation by the compensator 103 appears as the unevenness of the exposure intensity in an electrostatic latent image formed on the photosensitive member 117 by exposure by the exposure unit 101.

To reduce this residual component of the unevenness of exposure in a low-frequency region, this embodiment applies sigma-delta modulation in the spatial direction to the compensation value for compensating for the unevenness of exposure, thereby performing quantization by a predetermined number of quantization bits. More specifically, in the compensation value writing unit 102 to be explained below, a compensation value quantized by 32 quantization bits is quantized (requantized) to the value of eight quantization bits by using a second-order sigma-delta modulator. 32 as the number of quantization bits is equivalent to a second number of bits. Note that the explanation will be made by taking an example in which eight bits correspond to the first number of bits, and 32 bits correspond to the second number of bits. However, the point is that the first number of bits is smaller than the second number of bits, so neither number of bits is limited to any specific number of bits.

(Compensation Value Writing Unit 102)

The compensation value writing unit 102 calculates a compensation value to be applied to image data by using a compensation value generator 120 and the sigma-delta modulator 119, in order to compensate for the unevenness of exposure unique to the exposure unit 101. Furthermore, the compensation value writing unit 102 writes the calculated compensation value in the compensation value memory 104 of the exposure unit 101. When written, each compensation value is associated with a corresponding light-emitting element by the ordinal number of the element from one end of the light-emitting element array. Note that the compensation value memory 104 is a nonvolatile storage device. In this embodiment, it is assumed that a compensation value is calculated and the calculated compensation value is written when shipping the product. However, the compensation values may also be updated when the product is in operation, as will be explained later in the fourth embodiment.

A reference image signal generator 130 generates image data for causing the exposure unit 101 to emit light by an exposure amount (reference exposure amount) as the reference of exposure, and supplies the image data as the image signal 106 to the exposure unit 101 (this corresponds to n used in a divider 126 shown in FIG. 1). The reference exposure amount is equivalent to an exposure amount of 100% for each pixel. This reference exposure amount is a reference value when measuring the unevenness of exposure in a CCD 128, and generating a compensation value. When generating a compensation value, the exposure unit 101 causes all the light-emitting elements to evenly emit light by the reference exposure amount, thereby irradiating the photosensitive member 117 with the light. The CCD 128 is placed in a position close to the image formation position on the photosensitive member 117. The CCD 128 detects reflected light from the photosensitive member 117, and outputs a signal corresponding to the detected level to an A/D converter 127. The CCD 128 measures the unevenness of exposure equivalent to the unevenness of the exposure intensity occurring on the photosensitive member 117, along the spatial direction in which the plurality of lenses included in the lens array of the optical system 114 are arranged, and outputs the measurement value. Note that the CCD 128 outputs this signal in synchronism with a clock from a sample clock generator 129. The clock output from the sample clock generator 129 is triggered by the input of the horizontal sync signal 107 from the horizontal sync signal generator 131. A clock from a pixel clock generator 132 may also be used instead of the clock from the sample clock generator 129.

Based on the measurement value output from the CCD 128, the compensation value generator 120 generates a compensation value for compensating for the unevenness of exposure. This compensation value is generated as data (quantized data) obtained by quantizing, by 32 bits (the second number of bits), data corresponding to the change in measurement value obtained by the measurement by the CCD 128 from the reference value used in the measurement. In this embodiment, the A/D converter 127 and divider 126 generate the quantized compensation value. The A/D converter 127 quantizes the measurement value from the CCD 128 to a 32-bit digital value for each pixel by using the clock from the pixel clock generator 132, and outputs the obtained value to the divider 126.

The pixel clock generator 132 generates a pixel clock for performing sampling at a predetermined sampling period that is less than or equal to half of a period corresponding to the lens pitch of the lens array, and is not an integral multiple of the period. That is, the pixel clock generator 132 generates a pixel clock for performing sampling at least twice, at each pitch between the centers of the plurality of lenses included in the lens array in the spatial direction. The pixel clock generator 132 outputs the generated pixel clock to the compensation value generator 120 and sigma-delta modulator 119. The compensation value generator 120 generates a 32-bit compensation value at the period of the pixel clock supplied from the pixel clock generator 132, by using a value obtained by sampling the measurement value from the CCD 128. The sigma-delta modulator 119 executes sigma-delta modulation at the period of the pixel clock supplied from the pixel clock generator 132.

The divider 126 generates a compensation value (quantized data) for the unevenness of exposure, by using the data containing the unevenness of exposure and quantized to the digital value having 32-bit accuracy for each pixel by the A/D converter 127. The divider 126 obtains a compensation value having 32 quantization bits by calculating the reciprocal of the input digital data, and outputs the obtained compensation value to the sigma-delta modulator 119. A dividend n of the divider 126 shown in FIG. 1 is the reference value of the compensation value for the unevenness of exposure, and equivalent to the light emission amount for performing exposure by the above-described reference exposure value (100%). Thus, the A/D converter 127 and divider 126 generate a compensation value (quantized data) by quantizing the ratio of the measurement value of the unevenness of exposure to its reference value by 32 bits, and output the generated compensation value to the sigma-delta modulator 119. Note that in this embodiment, the data corresponding to the change in measurement value from the reference value is calculated as the ratio of the measurement value of the unevenness of exposure to its reference value. However, this data may also be calculated by another method. For example, the data may also be calculated by using the difference of the measurement value from the reference value. That is, a compensation value to be applied to image data need only be generated by using data indicating the change in actual measurement value from the reference value used as the reference when measuring the unevenness of exposure, so as to compensate for the change.

The 32-bit digital data (quantized data) input to the sigma-delta modulator 119 is processed by an adder 133, discrete integrator 123, adder 134, and discrete integrator 122, each of which has 32-bit wide, and the processed data is input to a requantizer 121. The requantizer 121 requantizes the input 32-bit (the second number of bits) digital data to 8-bit (the first number of bits) digital data by extracting only upper eight bits from the input digital data, and outputs the requantized digital data. The output data from the requantizer 121 is written as final 8-bit compensation data in the compensation value memory 104, and fed back to a delay unit 124 including a register in the sigma-delta modulator 119. The 8-bit digital data delayed by one sample is input to a constant multiple buffer 125. A constant m of the constant multiple buffer 125 is a coefficient for converting 8-bit data into 32-bit data, and $m=2^{(32-8)}$ in this embodiment. That is, the constant multiple buffer 125 allocates a data width of eight bits to a data width of 32 bits in the order from upper bits, pads zeros to bits lower than the eight bits, and outputs the obtained data.

The constant multiple buffer 125 supplies the 32-bit feedback data to the adders 133 and 134. The adder 134 subtracts the feedback data from the output data from the compensation value generator 120. The adder 133 subtracts the feedback data from the output data from the discrete integrator 123. By performing the processing as described above, the sigma-delta modulator 119 implements a circuit configuration in which the signal transfer function is 1 and the quantization noise transfer function is $(1-z^{-1})^2$ by z-region expression.

A frequency characteristic corresponding to quantization noise transfer function $(1-z^{-1})^2$ in the sigma-delta modulator 119 is $(2 \sin(\pi f))^4$. That is, the sigma-delta modulator 119 more reduces the quantization noise as the frequency decreases, and hence functions as a high-pass filter with respect to the quantization noise. In addition, as will be described later with reference to FIG. 2, the sigma-delta modulator 119 has a frequency characteristic that reduces the unevenness of exposure of a relatively low spatial frequency, that is, of the spatial frequency corresponding to the pitch of the plurality of lenses included in the lens array. The 8-bit compensation value modulated (requantized) by the sigma-delta modulator 119 having the circuit configuration as described above reduces noise in a low-frequency region, and reduces the level of the unevenness of exposure at a spatial frequency readily seen by a human. Consequently, the exposure unevenness compensation accuracy increases when the exposure unit 101 applies the compensation value generated by the compensation value writing unit 102 to image data for exposure.

Figure 2:
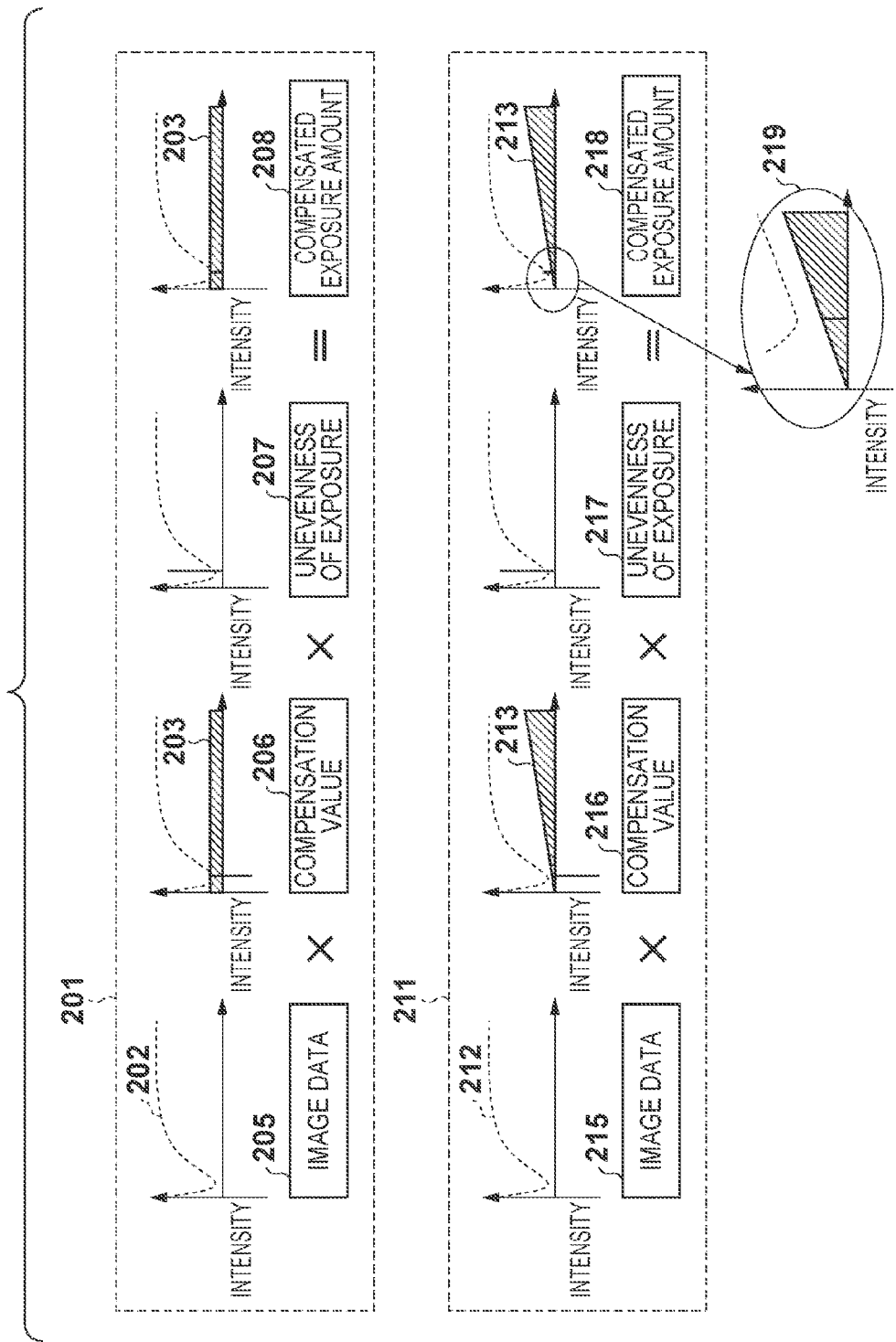
FIG. 2 is a conceptual view showing the concept of the signal processing related to the exposure unevenness compensation process by using frequency spectra.

FIG. 2 is a conceptual view showing the concept of signal processing related to the above-described exposure unevenness compensation process by using frequency spectra. In FIG. 2, 201 indicates the process of signal processing according to a comparative example, and 211 indicates the process of signal processing according to this embodiment. In the exposure unevenness compensation process of this comparative example, normal quantization is performed by a predetermine number of quantization bits (e.g., eight bits), without quantizing the compensation value by using sigma-delta modulation as in this embodiment. That is, in this comparative example, the reciprocal of light emission amount data containing the unevenness of exposure obtained by the divider 126 is directly used as the compensation value by the compensator 103.

As shown in FIG. 2, the compensator 103 multiplies image data 205 and 215 for exposure input to the exposure unit 101 by compensation values 206 and 216 in the comparative example and this embodiment. When exposing the photosensitive member 117 to light by using the obtained values (the gains of the light emission amounts), the light-emitting element array 109 and optical system 114 multiplicatively add unevenness of exposure 207 and unevenness of exposure 217 as noise components to the exposure amounts as described previously. As shown in FIG. 2, compensated final exposure amounts 208 and 218 can be modeled as the products.

FIG. 2 conceptually shows the frequency spectrum of each signal by plotting the spatial frequency on the abscissa, above each block described above. In each frequency spectrum shown in FIG. 2, 202 indicates the allowable level of the unevenness of exposure occurring when the exposure unit 101 performs the exposure, and shows the reciprocal of the spectral sensitivity characteristic shown in FIG. 8 as a graph. The graph 202 shows intensity equivalent to the allowable level of the unevenness of exposure as a reference value. Also, 201 and 211 in FIG. 2 indicate cases in which the unevenness of exposure occurs at a relative low spatial frequency corresponding to the lens pitch of the lens array in the optical system 114.

In the comparative example (201) shown in FIG. 2, quantization is performed on a compensation value generated as described above, so quantization noise 203 is produced in this compensation value due to a quantization error. Since this quantization is independently performed on data of each pixel in the spatial direction, the quantization noise is white noise. Therefore, the quantization noise 203 has as its frequency characteristic a transfer function having a flat intensity in the frequency direction. In the exposure unevenness compensation process using the compensation value generated in this comparative example, the limit of reducible exposure unevenness is defined by quantization noise depending on the number of quantization steps. Accordingly, when the number of quantization bits is small and the level of the quantization noise is relatively high as indicated by 201 in FIG. 2, unevenness of exposure remaining in the compensated exposure amount cannot be reduced to the allowable level or less in some cases.

By contrast, in this embodiment (211), a compensation value (having a large number of quantization bits) is generated from the measured exposure unevenness component, and sigma-delta modulation is used in the process of generating a final compensation value by requantizing the former compensation value. For example, a compensation value generated by 32 bits is quantized to eight bits by sigma-delta modulation, thereby generating a final compensation value. Because this quantization using sigma-delta modulation is integrally performed on data of pixels in the spatial direction, the quantization noise caused by a quantization error is shaped as indicated by 213 in FIG. 2. That is, in the frequency characteristic of the quantization noise 213, the noise level in a low-frequency region is decreased, and the noise component is pushed toward a high-frequency region.

219 in FIG. 2 shows that when the unevenness of exposure is compensated for by using the compensation value having undergone sigma-delta modulation, the spectrum of the compensated quantization noise 213 reduces the level to the allowable level or less at a spatial frequency at which the unevenness of exposure exists. Similarly, noise shaping by sigma-delta modulation reduces the level to a level lower than an allowable level 212 at the low spatial frequency at which the unevenness of exposure exists, and produces a sufficient margin for the reference value. That is, this unevenness of exposure is reduced to a level hardly seen by a human.

Figure 4:
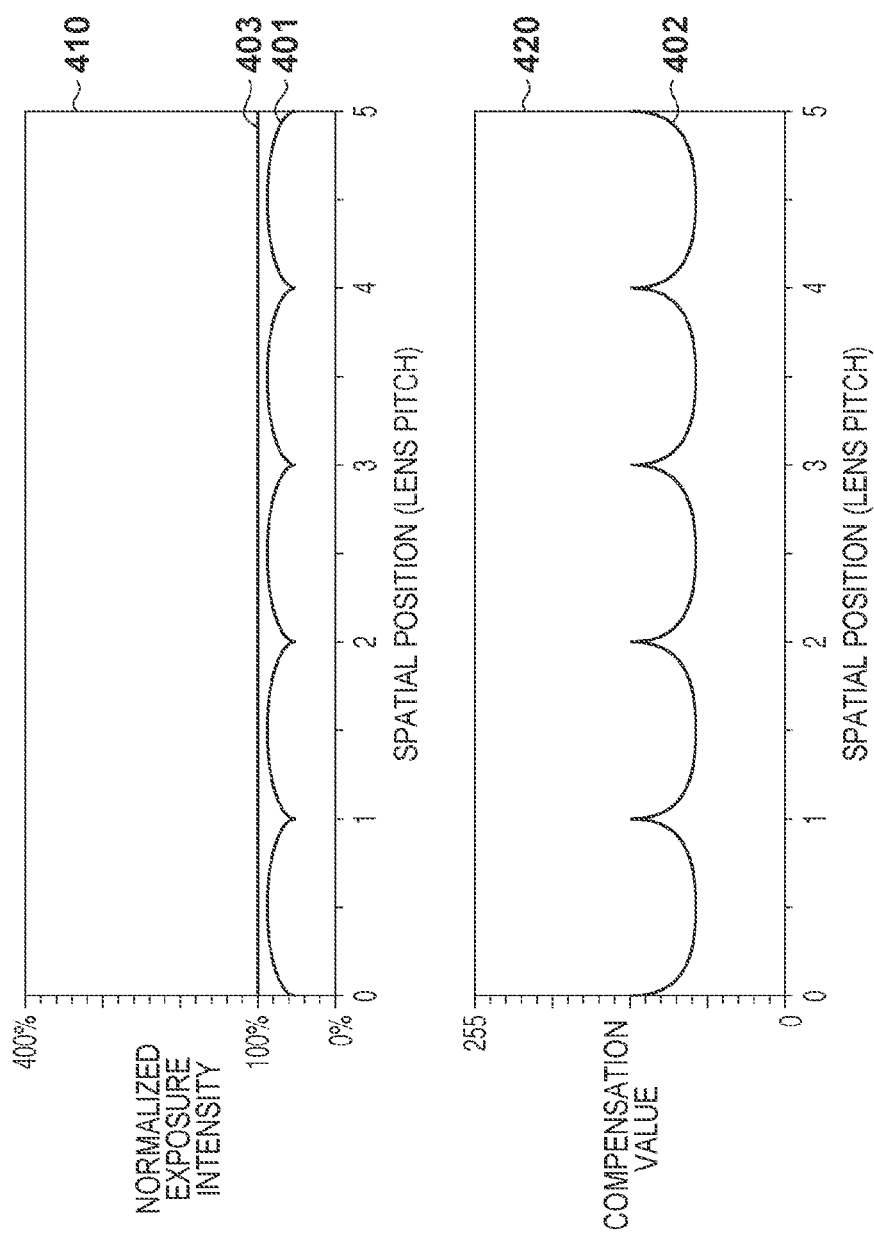
FIG. 4 is a view showing computer simulation results concerning the exposure unevenness compensation process according to the first embodiment.

The results of computer simulation performed to confirm the effectiveness of this embodiment will be explained below with reference to FIGS. 3 and 4. FIG. 3 illustrates the frequency spectra of the unevenness of exposure remaining after it is compensated for: 3*a* corresponds to the above-described comparative example (an example not using sigma-delta modulation), and 3*b* corresponds to an example in which a compensation value is generated by using sigma-delta modulation as in this embodiment. In FIG. 3, the abscissa indicates a spatial frequency normalized by the spatial frequency corresponding to the lens pitch (0.5 mm) of the optical system 114, and the ordinate indicates the squared amplitude (electric power) of the unevenness of exposure. FIG. 4 shows the relationship between the spatial position, exposure intensity, and compensation value obtained by the computer simulation. The abscissa in FIG. 4 indicates a spatial position normalized by the lens pitch (0.5 mm) of the optical system 114. In FIG. 4, the ordinate of a graph 410 indicates an exposure intensity normalized by the exposure intensity when exposure is performed by a pixel value of 100% as the pixel value of a reference image, and the ordinate of a graph 420 indicates the compensation value.

401 in FIG. 4 indicates the exposure intensity when the unevenness of exposure is not compensated for, and shows that unevenness of exposure corresponding to the spatial position occurs in this exposure intensity. By contrast, when the unevenness of exposure is compensated for by using the compensation value generated by the compensation value generation process according to this embodiment as indicated by 402, an exposure intensity 403 is obtained. Thus, when the unevenness of exposure is compensated for by using the compensation value generated by the processing according to this embodiment, the exposure intensity becomes constant regardless of the spatial position, and the unevenness of exposure reduces.

Figure 8:
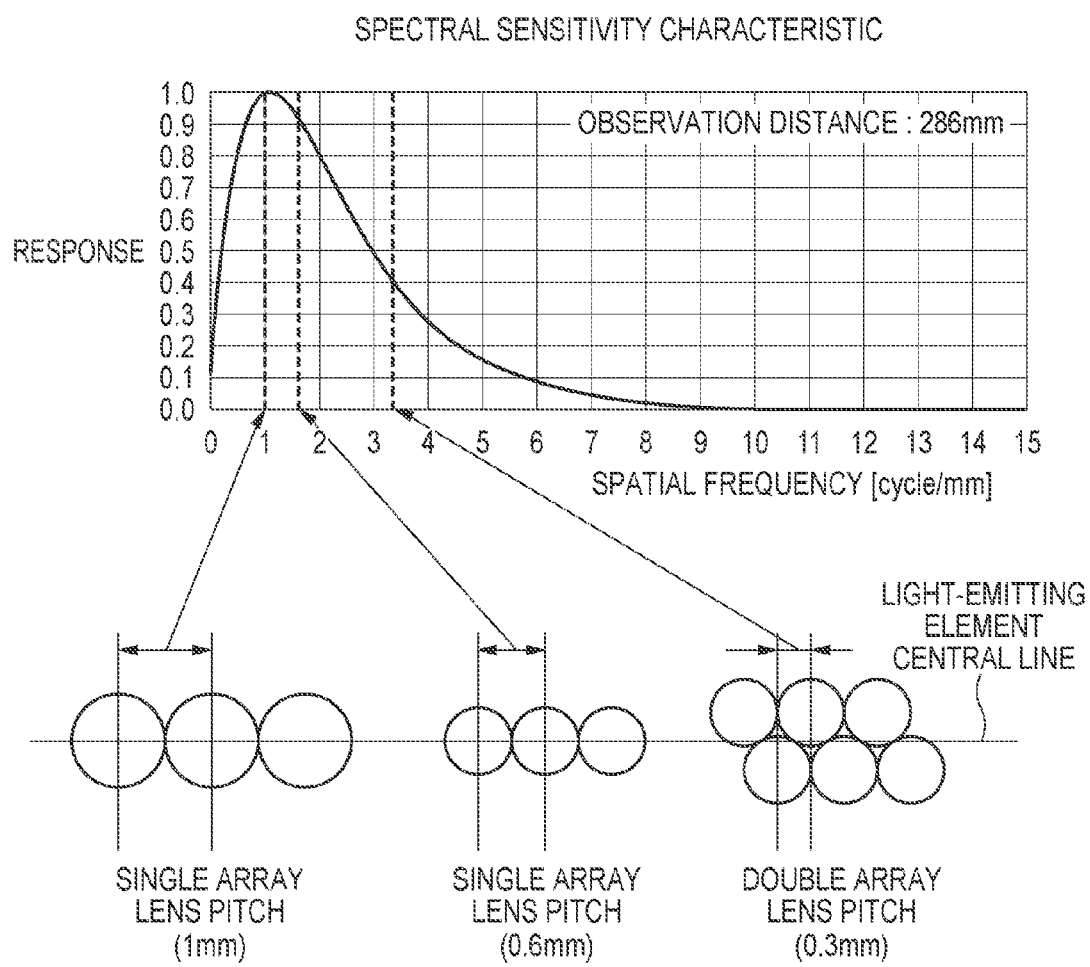
FIG. 8 is a view showing the relationship between the lens pitch in a lens array of an exposure apparatus and the spectral sensitivity characteristic.
Figure 9:
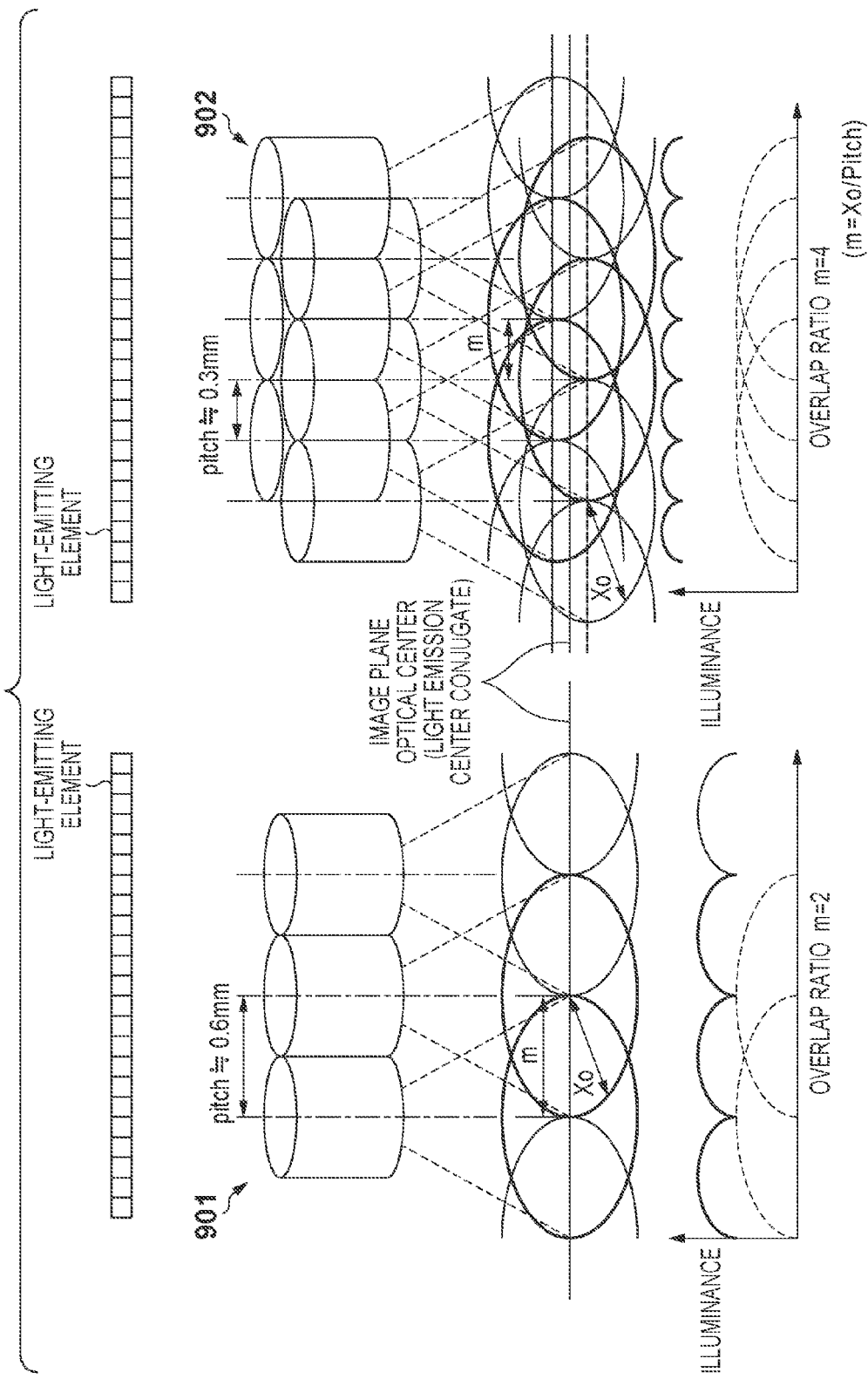
FIG. 9 is a view showing the relationship between the view range overlap ratio and illuminance characteristic of a gradient index lens.

302 in FIG. 3 is a graph showing the reciprocal of the spectral sensitivity characteristic shown in FIG. 8, similar to 202 and 212 in FIG. 2, and indicates the electric power equivalent to the allowable level of the unevenness of exposure as a reference value. The lower the electric power of the unevenness of exposure compared to the reference value 302, the larger the margin of this reference value. As this margin decreases, the unevenness of exposure remaining after the compensation process becomes easier to see for a human.

As shown in 3*a* of FIG. 3, when the compensation value generated by the compensation value generation process according to the above-mentioned comparative example is applied, the unevenness of exposure remains in the spatial frequency (=1) corresponding to the lens pitch, and in a harmonic component (of a spatial frequency an integral multiple of the former spatial frequency). In particular, as indicated by 301, an exposure unevenness component depending on the lens pitch remains in the spatial frequency corresponding to the lens pitch, and the reference value 302 has almost no margin for this exposure unevenness component.

On the other hand, as shown in 3*b* of FIG. 3, when the compensation value generated by the compensation value generation process according to this embodiment is applied, the exposure unevenness component at the spatial frequency (=1) corresponding to the lens pitch and the harmonic component of the exposure unevenness component largely reduce compared to those shown in 3*a* of FIG. 3. Also, this exposure unevenness component is pushed toward a high-spatial-frequency region as indicated by 303. This results from the noise shaping function of sigma-delta modulation used in this embodiment. Consequently, it is possible to reduce the unevenness of exposure occurring at the spatial frequency corresponding to the lens pitch, which can be a relatively low spatial frequency in association with a single lens array, so as to obtain a sufficient margin for the allowable level.

In this embodiment as explained above, when generating a compensation value for compensating for the unevenness of exposure, second-order sigma-delta modulation by the sigma-delta modulator 119 is used in the requantization of a compensation value generated based on the exposure unevenness measurement value output from the CCD 128. In an exposure apparatus that controls the exposure intensity by a predetermined number of quantization bits, this embodiment can compensate for the unevenness of the exposure intensity regardless of the configuration of a lens array used in the exposure apparatus. Especially near the spatial frequency corresponding to the peak of the spectral sensitivity characteristic of a human eye, it is possible to sufficiently reduce the unevenness of the exposure intensity caused by the lens array used in the exposure apparatus.

Second Embodiment

In the first embodiment, sigma-delta modulation is performed on the compensation value generated based on the noise obtained by combining the light-emitting system noise produced in the light-emitting element array 109, and the optical system noise produced in the optical system 114. By contrast, the second embodiment features that sigma-delta modulation is performed on only a compensation value generated based on an optical system noise produced in an optical system 114.

More specifically, when an light-emitting element array 109 emits light based on image data, light-emitting system noise (a first exposure unevenness component) and optical system noise (a second exposure unevenness component) are separately detected. Also, sigma-delta modulation is performed on only a compensation value (second quantized data) generated based on the detected light-emitting system noise. On the other hand, no sigma-delta modulation is performed on a compensation value (first quantized data) generated based on the detected optical system noise. Furthermore, the light emission amount gain is adjusted by separately applying exposure unevenness compensation processes using these compensation values to the image data. This processing further increases the compensation accuracy for the unevenness of exposure caused by the optical system noise.

Figure 5:
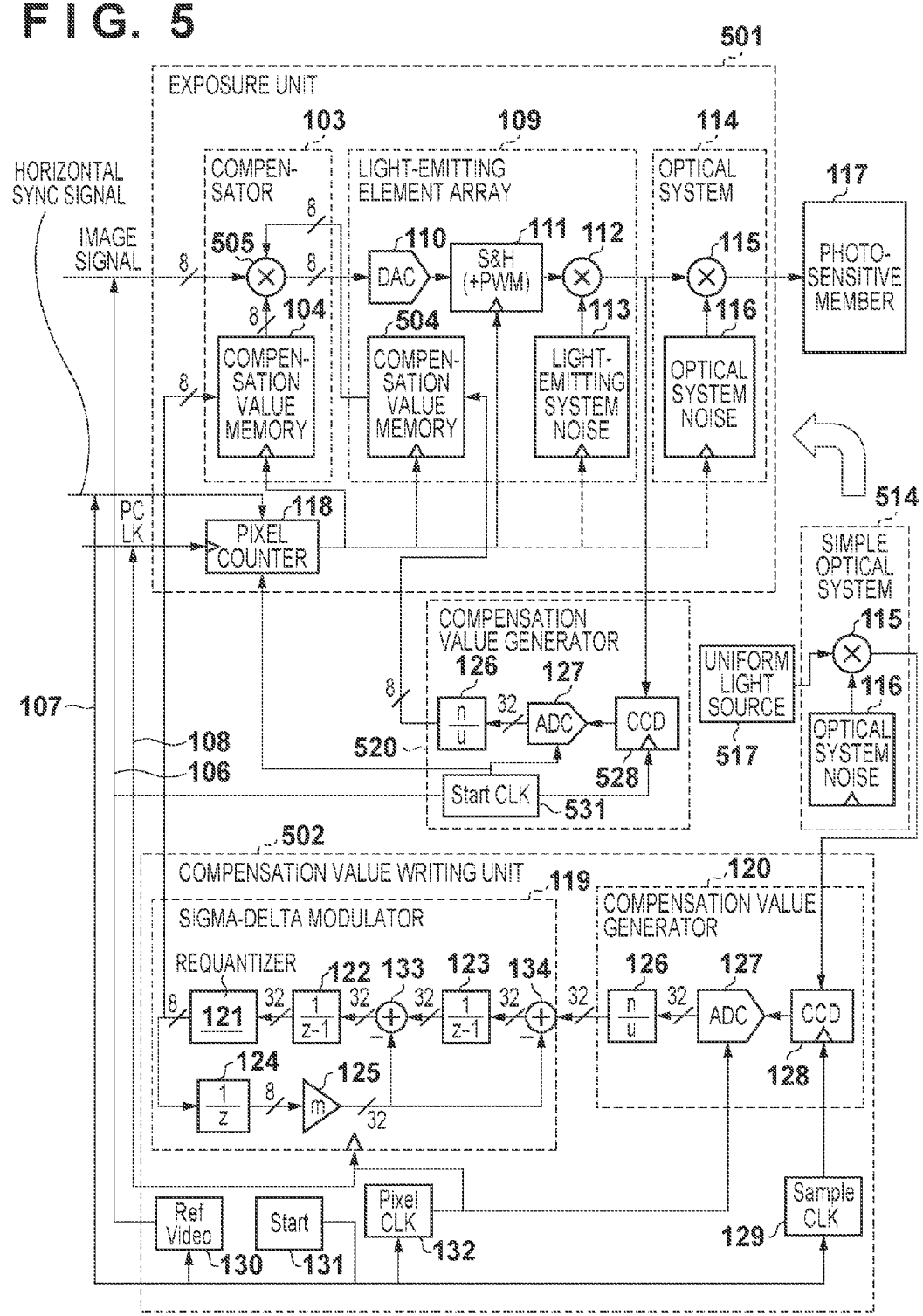
FIG. 5 is a block diagram of signal processing related to an exposure unevenness compensation process according to the second embodiment.

Signal processing related to the exposure unevenness compensation process according to the second embodiment will be explained below with reference to FIG. 5. To simplify the explanation, the same reference numerals as in the configuration (FIG. 1) of the first embodiment denote the same parts, and a repetitive explanation will be omitted. Note that in FIG. 5, an exposure unit (exposure apparatus) 501 is connected to a compensation value writing unit 502 and compensation value generator 520. In this embodiment, the compensation value writing unit 502 and compensation value generator 520 form an image processing apparatus that is connected to the exposure apparatus, and generates a compensation value (compensation data) for compensating for the unevenness of exposure equivalent to the unevenness of the exposure intensity occurring on a photosensitive member 117 as an exposure target when the exposure apparatus performs exposure.

In this embodiment, the exposure unit 501 is configured such that a CCD 528 can detect light emitted by the light-emitting element array 109. Therefore, light-emitting system noise equivalent to variations between pixels produced in only the light-emitting element array 109 can be measured by using the CCD 528. As the measurement value of the unevenness of exposure, the CCD 528 outputs the measurement value (a first measurement value) of the light-emitting system noise (first exposure unevenness component). Based on this measurement value, the compensation value generator 520 calculates, for each pixel, a 32-bit compensation value (first quantized data) for compensating for the unevenness of exposure caused by light-emitting system noise 113 produced in the light-emitting element array 109, in synchronism with a clock generated by a reference signal generator 531. The compensation value generator 520 writes, in a compensation value memory 504 formed in the exposure unit 501, a compensation value (first compensation data) obtained by reducing the calculated compensation value from 32 bits to eight bits.

A simple optical system 514 is an optical system in which no optical system 114 is incorporated into the exposure unit 501. In this embodiment, to measure optical system noise 116 produced in the optical system 114 independently of the light-emitting system noise 113, a CCD 128 of the compensation value writing unit 502 measures an image from a uniform light source 517. As the measurement value of the unevenness of exposure, the CCD 128 outputs the measurement value (a second measurement value) of the optical system noise (second exposure unevenness component). Based on the optical system noise measured by the CCD 128, a compensation value generator 120 generates a 32-bit compensation value (second quantized data) for compensating for the unevenness of exposure caused by this optical system noise, following the same procedure as in the first embodiment. In addition, a sigma-delta modulator 119 generates a final 8-bit compensation value (second compensation data) by performing sigma-delta modulation (requantization) on the generated compensation value, and writes the generated data in the compensation value memory 104.

In a compensator 103, a binomial multiplier 505 applies the exposure unevenness compensation value to input image data for exposure. More specifically, the compensator 103 compensates for the unevenness of exposure by adjusting the light emission amount gain by separately applying the compensation values stored in the compensation value memories 104 and 504 to the image data (by separately multiplying the image data by these compensation values). In this embodiment as described above, the compensator 103 separately applies the compensation values generated by the compensation value generators 520 and 120 to the image data. However, as will be explained in the third embodiment, it is also possible to combine the compensation values generated by the compensation value generators 520 and 120 by, for example, the compensation value writing unit 502 beforehand, and write the combined compensation value in the compensation value memory 104.

In this embodiment, a compensation value for the unevenness of exposure caused by the variations in light emission amount between pixels in a light-emitting element array is generated without applying any sigma-delta modulation. On the other hand, as in the first embodiment, sigma-delta modulation is applied to a compensation value for the unevenness of exposure occurring in accordance with the lens pitch of the optical system. This makes it possible to reduce the unevenness of exposure caused by the optical system, and increase a margin for an allowable level. The compensation accuracy for the unevenness of exposure further increases since it is also possible to appropriately reduce the unevenness of exposure caused by the variations in light emission amount between pixels in the light-emitting element array.

Third Embodiment

In the first and second embodiments, a modulator that performs second-order sigma-delta modulation is used as the sigma-delta modulator. In the third embodiment, a modulator that performs fourth-order sigma-delta modulation is used as a sigma-delta modulator. In addition, a process of correcting a signal delay caused by this modulation process is performed. This prevents the occurrence of a phase shift in the spatial direction between compensation values for light-emitting system noise and optical system noise.

Figure 6:
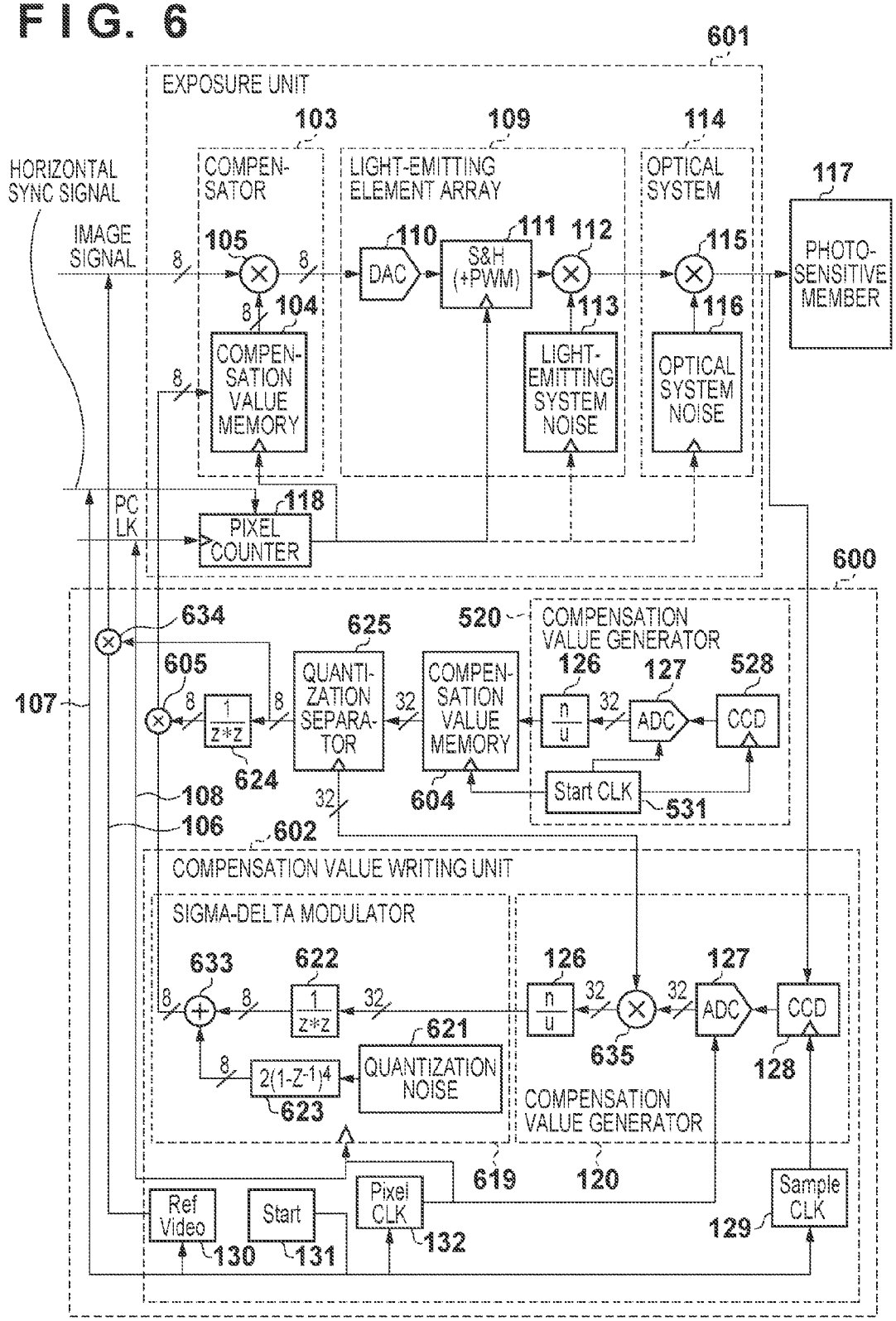
FIG. 6 is a block diagram of signal processing related to an exposure unevenness compensation process according to the third embodiment.

Signal processing related to an exposure unevenness compensation process according to the third embodiment will be explained below with reference to FIG. 6. To simplify the explanation, the same reference numerals as in the configurations (FIGS. 1 and 5) of the first and second embodiments denote the same parts, and a repetitive explanation will be omitted. Note that as in the second embodiment, compensation values corresponding to the light-emitting system noise and optical system noise are generated by separately measuring these noise components in this embodiment as well. However, FIG. 6 shows an example in which the unevenness of exposure caused by the light-emitting system noise is measured in the first pass, and the unevenness of exposure caused by the optical system noise is measured in the second pass with an optical system 114 being incorporated. Note that in FIG. 6, a configuration included in 600 is equivalent to that of an image processing apparatus.

Referring to FIG. 6, a compensation value generated by a compensation value generator 520 for the unevenness of exposure caused by the light-emitting system noise and a compensation value generated by a compensation value generator 120 and sigma-delta modulator 619 for the unevenness of exposure caused by the optical system noise are combined, and the combined compensation value is written in a compensation value memory 104. More specifically, a multiplier 605 combines the generated compensation values by multiplication.

In this embodiment, a compensation value writing unit 602 includes a fourth-order sigma-delta modulator 619, and applies a fourth-order transfer function 623 to quantization noise 621 produced by requantization of a compensation value. This reduces the quantization noise 621, and also reduces the optical system noise produced by the optical system 114 by the transfer function, thereby increasing the accuracy of the requantized compensation value. Note that FIG. 6 shows the quantization noise 621 and transfer function 623 as models.

The 32-bit output from the compensation value generator 520 for generating the compensation value for the unevenness of exposure caused by the light-emitting system noise is temporarily stored in a compensation value memory 604, and then supplied to a quantization separator 625. When measuring the unevenness of exposure caused by the optical system noise in the second pass, the quantization separator 625 extracts upper eight bits of the compensation value from the compensation memory 604, and supplies the extracted bits to a multiplier 634. The multiplier 634 multiplies reference light emission amount data by the value of the eight bits, thereby generating light emission amount data in which the light-emitting system noise is compensated for. A light-emitting element array 109 emits light based on this light emission amount data, and the unevenness of exposure caused by the optical system noise is measured in the second pass. Also, the quantization separator 625 changes upper eight bits of the data from the compensation value memory 604 to 1, and combines the upper eight bits and lower 24 bits separated as described above, thereby generating 32-bit quantization error compensation data. Furthermore, the quantization separator 625 causes a multiplier 635 to multiply the measurement value of the optical system noise by the generated data, thereby canceling a quantization error contained in the compensation value for the light-emitting system noise.

The compensation value for the optical system noise, which is generated by the compensation value generator 120, is input to the sigma-delta modulator 619, and undergoes fourth-order sigma-delta modulation. 622 indicates a signal transfer function that gives the compensation value signal a delay amount necessary for a stable operation of the fourth-order sigma-delta modulator 619. The compensation value requantized in the sigma-delta modulator 619 is supplied to the multiplier 605.

On the other hand, the quantization separator 625 extracts upper eight bits of the compensation value from the compensation value memory 604, and supplies the extracted bits to a delay adjusting register 624. The delay adjusting register 624 outputs data at the timing at which the multiplier 605 multiplies the compensation value in the register by the compensation value from the sigma-delta modulator 619 of the compensation value writing unit 602 with the spatial phases being matched. Finally, the data having undergone the multiplication by the multiplier 605 is written in a compensation value memory 104, and used in an exposure unevenness compensation process in the same manner as in the above-described embodiments.

In this embodiment, the delay adjusting register 624 adjusts the output timing of the compensation value for the light-emitting system noise. This makes it possible to adjust, in the spatial direction, the phase of this compensation value and the phase of the compensation value for the optical system noise, which has undergone fourth-order sigma-delta modulation. Consequently, it is possible to, by fourth-order sigma-delta modulation, further reduce the unevenness of exposure caused by the optical system noise and further increase the compensation accuracy for the unevenness of exposure, while preventing the occurrence of a phase shift between the two noise components in the spatial direction.

Fourth Embodiment

In each of the first to third embodiments, an image processing apparatus including a compensation value writing unit that generates, by applying a sigma-delta modulator, a compensation value for the unevenness of exposure occurring when an exposure unit (exposure apparatus) performs exposure and writes the compensation value in memories (the compensation value memories 104 and 504) in the exposure unit has been explained. These embodiments basically assume that a compensation value suited to the exposure unit is generated and prewritten in the memories of the exposure unit when shipping the product. The fourth embodiment will explain a mode in which when the exposure unit is actually installed in an image forming apparatus main body, a compensation value is updated to follow the change in light emission characteristic of a light-emitting element array in the exposure unit after it has started operating.

Figure 7:
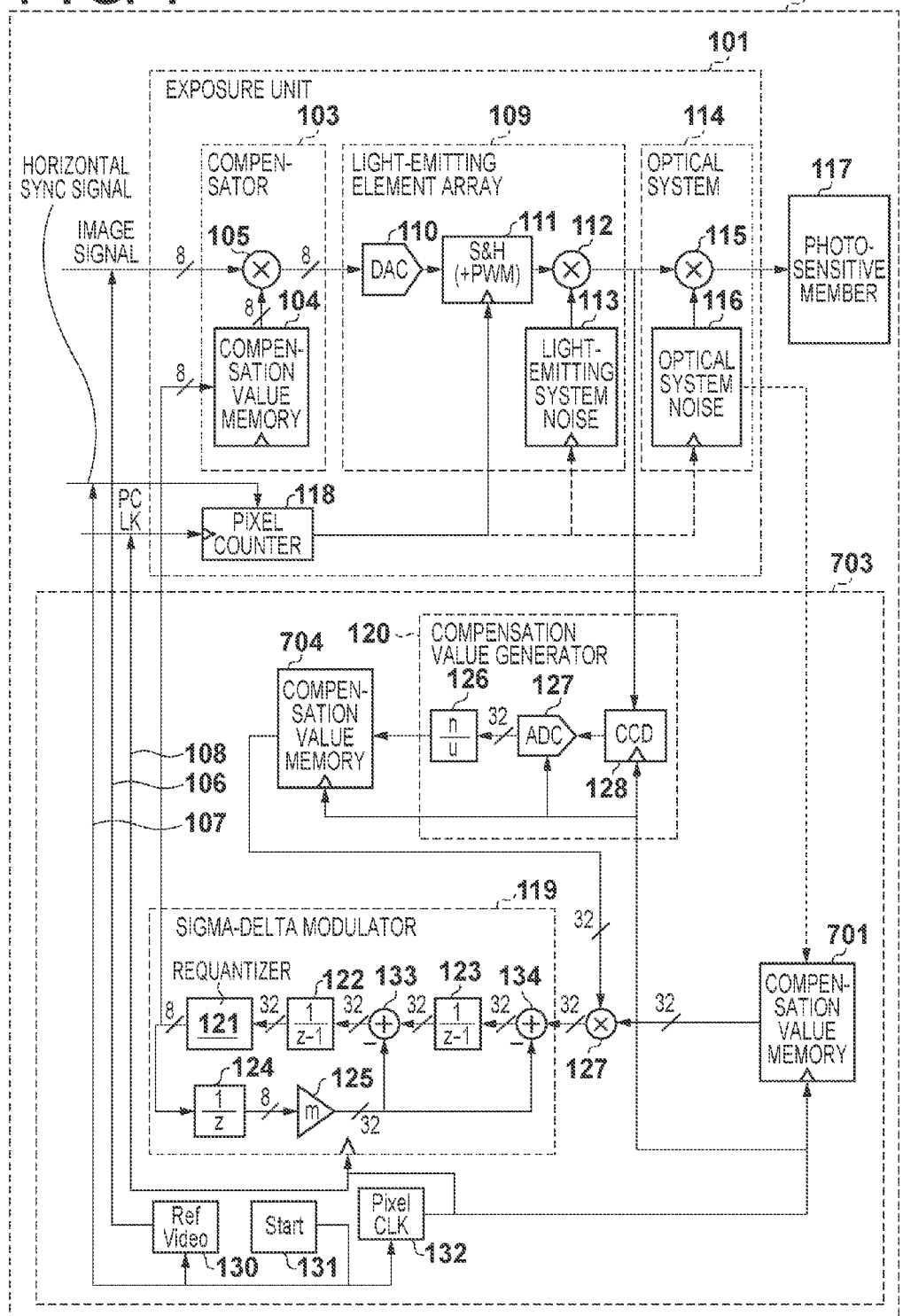
FIG. 7 is a block diagram of signal processing related to an exposure unevenness compensation process according to the fourth embodiment.

Signal processing related to an exposure unevenness compensation process in an image forming apparatus according to the fourth embodiment will be explained below with reference to FIG. 7. To simplify the explanation, the same reference numerals as in the configuration (FIG. 1) of the first embodiment denote the same parts, and a repetitive explanation will be omitted. Note that in FIG. 7, a configuration included in 703 is equivalent to that of an image processing apparatus.

An image forming apparatus 700 includes an exposure unit (exposure apparatus) 101, image processing apparatus 703, and photosensitive member (image carrier) 117. As in the first embodiment, the exposure unit 101 includes a compensator 103, light-emitting element array 109, and optical system 114. The image forming apparatus 700 further includes a compensation value generator 120 including a CCD 128 for detecting and measuring the unevenness of exposure caused by the light-emitting element array 109. After the photosensitive member 117 is irradiated with light emitted by the light-emitting element array 109, the CCD 128 detects the reflected light. The image forming apparatus 700 exposes the photosensitive member 117 to light in accordance with image data by using the exposure unit 101, thereby forming an electrostatic latent image on the photosensitive member 117. Furthermore, the image forming apparatus 700 develops the electrostatic latent image with a single-color developer or multicolor developers (toner) and transfers the developed image onto a recording material (paper sheet), thereby forming an image on the recording material.

The image forming apparatus 700 further includes a sigma-delta modulator 119 for performing sigma-delta modulation on a compensation value generated by the compensation value generator 120 from the measurement value of the unevenness of exposure. Also, the measurement value of the unevenness of exposure caused by optical system noise in the optical system 114 is prestored in a compensation value memory 701. A compensation value for the unevenness of exposure of the light-emitting element array 109, which is measured before the start of printing (image formation), is stored in a compensation value register 704. When starting actual printing, the compensation value is read out from the compensation value register 704, and supplied to a multiplier 702.

The multiplier 702 performs multiplication on the compensation value for the optical system noise from the compensation value memory 701 and the compensation value for the light-emitting system noise from the compensation value register 704, and outputs the product to the sigma-delta modulator 119. An input to the sigma-delta modulator 119 is 32-bit data. The sigma-delta modulator 119 requantizes this 32-bit data to 8-bit data by performing sigma-delta modulation, and increases the compensation accuracy for the unevenness of exposure in the same manner as in the above-described embodiments.

In this embodiment, the image forming apparatus generates, before printing, a compensation value for the unevenness of exposure occurring in the light-emitting element array 109, and, when printing is actually started, combines this compensation value with a compensation value for the unevenness of exposure occurring in the optical system 114. In addition, during printing, the image forming apparatus performs an exposure unevenness compensation process based on the combined final compensation value, thereby exposing the photosensitive member 117 to light. This makes it possible to perform the exposure unevenness compensation process by following a temporal change in light emission amount of the light-emitting element array 109 as well.

Note that when the image forming apparatus includes a scanner unit, the above-described generation of the compensation value for the unevenness of exposure can also be performed based on data obtained by scanning a recording material on which a predetermined pattern is printed by using the scanner unit.

Other Embodiments

In the fourth embodiment, the image forming apparatus 700 includes the exposure unit 101, photosensitive member 117, and image processing apparatus 703, and the compensation value in the nonvolatile storage device (compensation value memory 104) of the exposure unit 101 is updated in accordance with the measurement value of the unevenness of exposure. However, the present invention is also applicable to an arrangement in which the image forming apparatus 700 does not include the image processing apparatus 703.

In this arrangement, the image forming apparatus 700 does not update the compensation value prewritten in the compensation value memory 104. Also, the compensator 103 compensates for the unevenness of exposure by reading out a fixed compensation value stored in the compensation value memory 104, and applying the readout value to image data. Note that FIG. 7 shows the configuration in which the compensation value memory 104 storing the compensation value is installed in the exposure unit 101, but the compensation value memory 104 may also be installed in a given portion except for the exposure unit 101 in the image forming apparatus 700.

The image forming apparatus 700 exposes the photosensitive member 117 to light by the exposure unit 101 by using image data to which the compensation process using the compensation value is applied by the compensator 103. In addition, the image forming apparatus 700 develops an electrostatic latent image formed on the photosensitive member 117 by toner, and transfers the image onto a sheet of paper, thereby forming the image on the sheet. Note that the compensation value prestored in the compensation value memory 104 can be generated following the same procedure as that executed in the image processing apparatus explained in each of the first to third embodiments described above. When the exposure apparatus for controlling the exposure intensity by a predetermined number of quantization bits performs exposure, even the image forming apparatus like this can compensate for the unevenness of the exposure intensity regardless of the arrangement of the lens array used in the exposure apparatus, in the same manner as in the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-286645, filed Dec. 22, 2010, which is hereby incorporated by reference herein in its entirety.

What is claimed is:

1. An image forming apparatus which comprises an image carrier, and forms an image by developing an electrostatic latent image formed on said image carrier by a developer, comprising:
   an exposure unit that includes a plurality of linearly arranged light-emitting elements that emit light by a light amount corresponding to image data quantized by a first number of bits, and a lens array including a plurality of linearly arranged lenses, and exposes said image carrier by light that is emitted from the plurality of light-emitting elements and passes through said lens array;
   a storage unit storing compensation data being used to compensate for unevenness of exposure equivalent to unevenness of exposure intensity occurring on said image carrier when said exposure unit performs exposure; and
   a compensation unit that compensates for the unevenness of exposure by applying the compensation data stored in said storage unit to the image data,
   wherein the compensation data is obtained by quantizing, by a second number of bits larger than the first number of bits, data corresponding to a change in measurement value obtained by measuring the unevenness of exposure occurring on said image carrier from a reference value used in the measurement, and requantizing the quantized data by the first number of bits by using sigma-delta modulation,
   wherein the compensation data has a frequency characteristic in which quantization noise produced by the requantizing of the quantized data is reduced more by the sigma-delta modulation as a frequency decreases.

2. An image processing apparatus which is connected to an exposure apparatus that includes a plurality of linearly arranged light-emitting elements that emit light by a light amount corresponding to image data quantized by a first number of bits, and a lens array including a plurality of linearly arranged lenses, and exposes an exposure target by light that is emitted from the plurality of light-emitting elements and passes through said lens array, and which generates compensation data to be applied to the image data in order to compensate for unevenness of exposure equivalent to unevenness of exposure intensity occurring on said exposure target when said exposure apparatus performs exposure, comprising:
   a measurement unit that measures unevenness of exposure occurring on said exposure target exposed to light by said exposure apparatus;
   a generation unit that generates quantized data by quantizing, by a second number of bits larger than the first number of bits, data corresponding to a change in measurement value obtained by measurement by said measurement unit from a reference value used in the measurement; and
   a modulation unit that applies sigma-delta modulation to the quantized data having the second number of bits generated by said generation unit, and outputs the compensation data requantized by the first number of bits,
   wherein the compensation data has a frequency characteristic in which quantization noise produced by the requantizing of the quantized data is reduced more by the sigma-delta modulation as a frequency decreases.

3. The apparatus according to claim 2, wherein
   said measurement unit measures unevenness of exposure occurring on said exposure target along a spatial direction in which the plurality of lenses included in said lens array are arranged,
   said generation unit generates the quantized data having the second number of bits by using a value obtained by sampling a measurement value obtained by said measurement unit at a predetermined period along the spatial direction,
   said modulation unit applies sigma-delta modulation to the quantized data having the second number of bits at the predetermined period, and outputs the compensation data having the first number of bits, and
   the predetermined period is a period determined such that said generation unit performs sampling at least twice at a pitch between centers of the plurality of lenses in the spatial direction.

4. The apparatus according to claim 3, wherein said modulation unit has a frequency characteristic by which quantization noise produced when the quantized data generated by said generation unit is requantized from the second number of bits to the first number of bits is reduced more at a lower frequency, and unevenness of exposure at a spatial frequency corresponding to the pitch of said lens array is reduced.

5. The apparatus according to claim 2, wherein
   said measurement unit outputs a first measurement value for a first exposure unevenness component caused by the plurality of light-emitting elements, and a second measurement value for a second exposure unevenness component caused by said lens array, as measurement values of unevenness of exposure occurring on said exposure target exposed to light by said exposure apparatus,
   said generation unit generates first quantized data having the second number of bits for the first exposure unevenness component based on the first measurement value, and second quantized data having the second number of bits for the second exposure unevenness component based on the second measurement value,
   said modulation unit applies the sigma-delta modulation on the second quantized data having the second number of bits, and outputs second compensation data requantized by the first number of bits, and
   the image processing apparatus further comprises a combining unit that outputs the compensation data having the first number of bits by combining first compensation data obtained by reducing the number of quantization bits of the first quantized data from the second number of bits to the first number of bits, and the second compensation data having the first number of bits output from said modulation unit.

6. The apparatus according to claim 5, wherein
   said modulation unit applies fourth-order sigma-delta modulation to the second quantized data, and outputs the second compensation data requantized by the first number of bits, and
   said combining unit combines the first compensation data and the second compensation data with phases in a spatial direction being matched, so as to compensate for a delay caused by the fourth-order sigma-delta modulation.

7. The apparatus according to claim 2, wherein said modulation unit reduces the quantization noise produced when the quantized data generated by said generation unit is requantized from the second number of bits to the first number of bits.

8. An image forming apparatus comprising:

an image processing apparatus according to claim 2;

an exposure apparatus connected to said image processing apparatus; and an image carrier as an exposure target of said exposure apparatus, wherein the image forming apparatus develops an electrostatic latent image formed on said image carrier by exposing said image carrier to light in accordance with the image data by said exposure apparatus by a developer and transfers the developed image onto a recording material, thereby performing image formation on the recording material, said image processing apparatus generates the compensation data to be applied to the image data, when image formation on the recording material is started, and said exposure apparatus compensates for unevenness of exposure occurring on said image carrier, by applying the compensation data generated by said image processing apparatus to the image data.

* * * * *